(12) United States Patent
MacKay et al.

(10) Patent No.: US 7,539,154 B1
(45) Date of Patent: May 26, 2009

(54) METHOD AND APPARATUS TO DETECT AND BREAK LOOP CONFIGURATION

(75) Inventors: Gordon MacKay, Santa Clara, CA (US); James P. Rivers, Saratoga, CA (US); Rita Ousterhout, Palo Alto, CA (US); Sean X. Wang, Fremont, CA (US); John K. Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1612 days.

(21) Appl. No.: 09/691,419

(22) Filed: Oct. 17, 2000

(51) Int. Cl.
*H04L 12/28* (2006.01)
*H04B 3/36* (2006.01)

(52) U.S. Cl. .................. 370/256; 370/254; 370/352; 370/389; 370/402; 370/455; 370/216; 370/293; 370/501

(58) Field of Classification Search ............... 370/219, 370/224, 242, 249, 254–256, 258, 400–406, 370/352, 389, 455, 216, 293, 501
See application file for complete search history.

(56) References Cited

U.S. PATENT DOCUMENTS

| | | | |
|---|---|---|---|
| 3,533,045 A | 10/1970 | Henschen | |
| 3,652,899 A | 3/1972 | Henschen | |
| 3,704,394 A | 11/1972 | Johnson | |
| 3,905,665 A | 9/1975 | Lynch et al. | |
| 4,399,531 A * | 8/1983 | Grande et al. | 370/216 |
| 4,451,916 A | 5/1984 | Casper et al. | |
| 4,529,979 A * | 7/1985 | Kusama et al. | 370/249 |
| 4,551,829 A | 11/1985 | Dragoo et al. | |
| 4,745,597 A * | 5/1988 | Morgan et al. | 370/224 |
| 4,832,619 A | 5/1989 | Eck et al. | |
| 4,869,680 A | 9/1989 | Yamamoto et al. | |
| 4,995,035 A * | 2/1991 | Cole et al. | 370/254 |
| 5,016,142 A | 5/1991 | White | |
| 5,115,495 A * | 5/1992 | Tsuchiya et al. | 709/239 |
| 5,123,859 A | 6/1992 | Davis et al. | |
| 5,176,221 A | 1/1993 | Aprill | |
| 5,181,858 A | 1/1993 | Matz et al. | |

(Continued)

OTHER PUBLICATIONS

US Office Action-Restriction Requirement, Jan. 14, 2003, U.S. Appl. No. 09/321,066.

(Continued)

*Primary Examiner*—Daniel J Ryman
*Assistant Examiner*—Venkatesh Haliyur
(74) *Attorney, Agent, or Firm*—Weaver Austin Villeneuve & Sampson LLP

(57) ABSTRACT

In a system having a plurality of nodes such as Ethernet repeaters, coupled by communication links such as cables, systems and protocols are provided for detecting and/or breaking loops. In one aspect, in response to an added link, a repeater sends a "detect loop" message containing its address to at least one neighbor. Each repeater which receives the "detect loop" message, in turn, sends it to its own neighbor, with the lesser of the received address and its own address. A repeater which receives a "detect loop" message containing its own address declares itself a master loop breaker and can isolate one of its ports to break the loop. In one aspect, a previously intentionally-isolated port can be re-activated, e.g., in response to the loss of a communication link which could potentially isolate one or more nodes.

15 Claims, 9 Drawing Sheets

U.S. PATENT DOCUMENTS

| | | | |
|---|---|---|---|
| 5,222,168 A | 6/1993 | Saito et al. | |
| 5,291,368 A | 3/1994 | Conroy-Wass | |
| 5,295,154 A * | 3/1994 | Meier et al. | 370/351 |
| 5,321,812 A * | 6/1994 | Benedict et al. | 709/223 |
| 5,432,775 A | 7/1995 | Crayford | |
| 5,491,418 A | 2/1996 | Alfaro et al. | |
| 5,535,195 A * | 7/1996 | Lee | 370/256 |
| D372,708 S | 8/1996 | Hetherington | |
| 5,610,903 A | 3/1997 | Crayford | |
| 5,649,001 A | 7/1997 | Thomas et al. | |
| D382,857 S | 8/1997 | Chen et al. | |
| 5,660,567 A | 8/1997 | Nierlich et al. | |
| 5,663,960 A | 9/1997 | Le Guen et al. | |
| 5,673,254 A | 9/1997 | Crayford | |
| D386,473 S | 11/1997 | England et al. | |
| 5,716,221 A | 2/1998 | Kantner | |
| 5,757,618 A | 5/1998 | Lee | |
| 5,757,998 A | 5/1998 | Thatcher et al. | |
| 5,767,999 A | 6/1998 | Kayner | |
| 5,771,235 A | 6/1998 | Tang et al. | |
| 5,784,557 A * | 7/1998 | Oprescu | 709/220 |
| 5,801,928 A | 9/1998 | Burstedt et al. | |
| 5,809,328 A | 9/1998 | Nogales et al. | |
| 5,825,755 A | 10/1998 | Thompson et al. | |
| 5,836,785 A | 11/1998 | Lee | |
| 5,879,173 A | 3/1999 | Poplawski et al. | |
| 5,882,211 A | 3/1999 | Choy et al. | |
| 5,892,926 A | 4/1999 | Witkowski et al. | |
| 5,901,263 A | 5/1999 | Gaio et al. | |
| 5,912,998 A | 6/1999 | Quayle | |
| D411,827 S | 7/1999 | Gilliland et al. | |
| 5,963,719 A | 10/1999 | Fite et al. | |
| 5,993,224 A | 11/1999 | Quillet et al. | |
| 6,023,472 A | 2/2000 | Kupchik et al. | |
| 6,023,544 A | 2/2000 | Dragone | |
| 6,044,305 A * | 3/2000 | Larson et al. | 700/87 |
| 6,047,172 A | 4/2000 | Babineau et al. | |
| 6,061,737 A | 5/2000 | Fite et al. | |
| 6,074,228 A | 6/2000 | Berg et al. | |
| 6,097,705 A | 8/2000 | Ben-Michael et al. | |
| 6,108,198 A | 8/2000 | Lin | |
| 6,115,263 A | 9/2000 | Babineau et al. | |
| 6,141,349 A * | 10/2000 | Ikeda et al. | 370/405 |
| 6,141,350 A | 10/2000 | Mahale et al. | |
| 6,151,326 A * | 11/2000 | McGuire et al. | 370/402 |
| 6,163,637 A | 12/2000 | Zimgibi | |
| D436,919 S | 1/2001 | Wakefield et al. | |
| 6,188,668 B1 * | 2/2001 | Brewer et al. | 370/222 |
| 6,195,425 B1 * | 2/2001 | Farris | 379/230 |
| 6,198,727 B1 | 3/2001 | Wakeley et al. | |
| 6,236,659 B1 * | 5/2001 | Pascoe | 370/404 |
| 6,243,510 B1 | 6/2001 | Rauch | |
| 6,272,019 B1 | 8/2001 | Edwards et al. | |
| 6,289,042 B1 | 9/2001 | Hegemier et al. | |
| 6,305,848 B1 | 10/2001 | Gregory | |
| 6,343,083 B1 | 1/2002 | Mendelson et al. | |
| 6,366,567 B1 | 4/2002 | Singh et al. | |
| 6,373,826 B1 * | 4/2002 | Russell et al. | 370/256 |
| 6,374,316 B1 * | 4/2002 | James et al. | 710/104 |
| 6,431,765 B1 | 8/2002 | Chen et al. | |
| 6,462,435 B1 | 10/2002 | Covaro et al. | |
| 6,470,026 B1 * | 10/2002 | Pearson et al. | 370/463 |
| 6,490,276 B1 | 12/2002 | Salett et al. | |
| 6,501,754 B1 * | 12/2002 | Ohba et al. | 370/389 |
| 6,546,010 B1 | 4/2003 | Merchant et al. | |
| 6,556,983 B1 * | 4/2003 | Altschuler et al. | 706/55 |
| 6,576,833 B2 | 6/2003 | Twiss et al. | |
| 6,587,904 B1 * | 7/2003 | Hauck et al. | 710/107 |
| 6,600,727 B1 | 7/2003 | MacKay et al. | |
| 6,614,764 B1 * | 9/2003 | Rodeheffer et al. | 370/254 |
| 6,628,607 B1 * | 9/2003 | Hauck et al. | 370/216 |
| 6,628,624 B1 * | 9/2003 | Mahajan et al. | 370/256 |
| 6,628,703 B1 | 9/2003 | Hegemier et al. | |
| 6,643,269 B1 * | 11/2003 | Fan et al. | 370/254 |
| 6,654,353 B1 * | 11/2003 | Tokura et al. | 370/254 |
| 6,690,657 B1 | 2/2004 | Lau et al. | |
| 6,785,226 B1 * | 8/2004 | Oltman et al. | 370/228 |
| 6,798,739 B1 * | 9/2004 | Lee | 370/216 |
| 6,865,160 B1 * | 3/2005 | Bare | 370/256 |
| 6,952,421 B1 * | 10/2005 | Slater | 370/401 |
| 6,954,437 B1 * | 10/2005 | Sylvest et al. | 370/256 |
| 6,973,230 B1 | 12/2005 | MacKay et al. | |
| 7,194,564 B2 * | 3/2007 | Hauck et al. | 710/104 |
| 2002/0024261 A1 | 2/2002 | Covaro et al. | |

OTHER PUBLICATIONS

US Office Action-Restriction Requirement, Feb. 24, 2003, U.S. Appl. No. 09/321,066.
Notice of Allowance and Allowability, Mar. 25, 2003, U.S. Appl. No. 09/321,066.
US Office Action, Jun. 29, 2007, U.S. Appl. No. 10/453,813.
US Office Action, Feb. 19, 2008, U.S. Appl. No. 10/453,813.
US Office Action-Restriction Requirement, Mar. 24, 2004, U.S. Appl. No. 10/453,814.
Notice of Allowance and Allowability, May 20, 2004, U.S. Appl. No. 10/453,814.
US Office Action, May 28, 2008, U.S. Appl. No. 10/899,672.
Notice of Allowance and Allowability, Feb. 22, 2002, U.S. Appl. No. 09/330,733.
US Office Action, Nov. 13, 2000, U.S. Appl. No. 09/330,434.
Notice of Allowance and Allowability, Mar. 12, 2001, U.S. Appl. No. 09/330,434.
Notice of Allowance and Allowability, Sep. 9, 2008, U.S. Appl. No. 10/453,813.

* cited by examiner

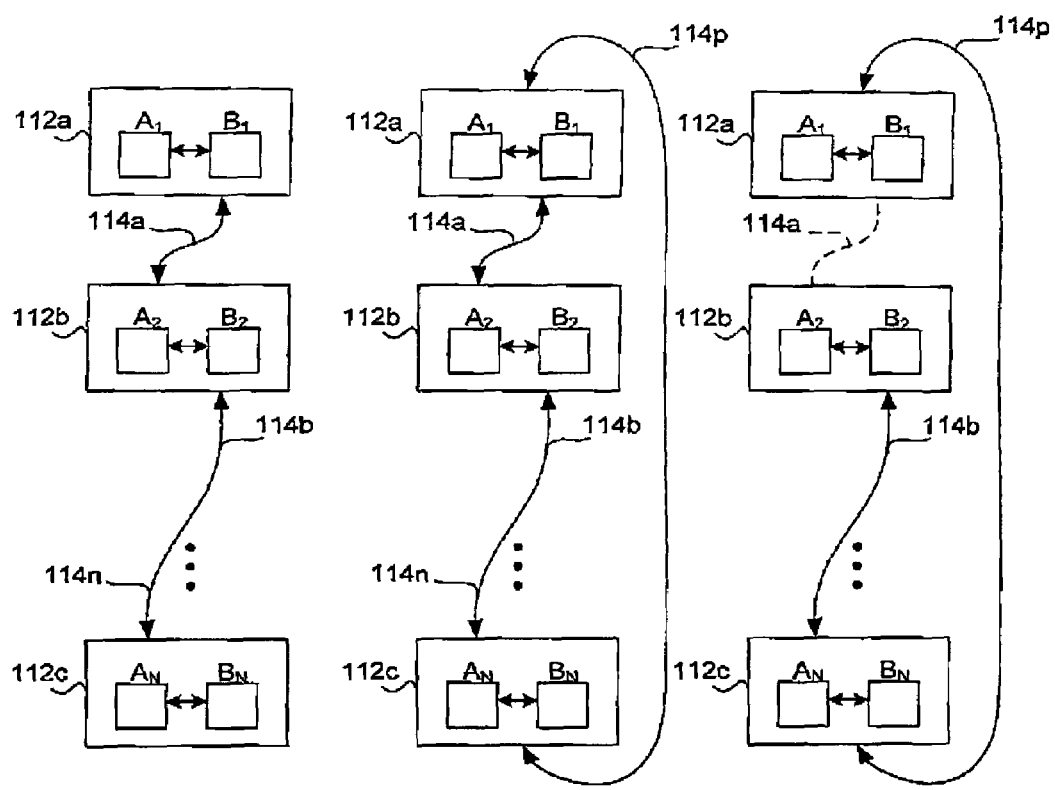
FIG. 1A   FIG. 1B   FIG. 1C

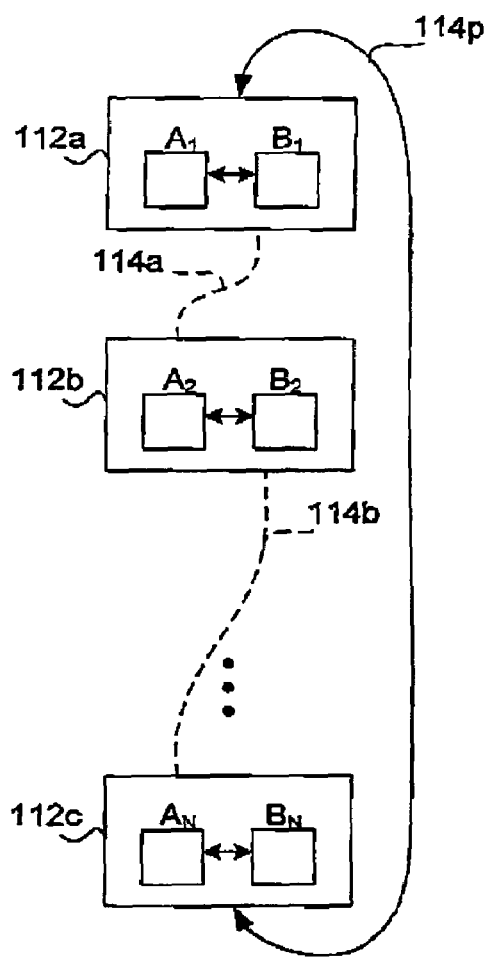 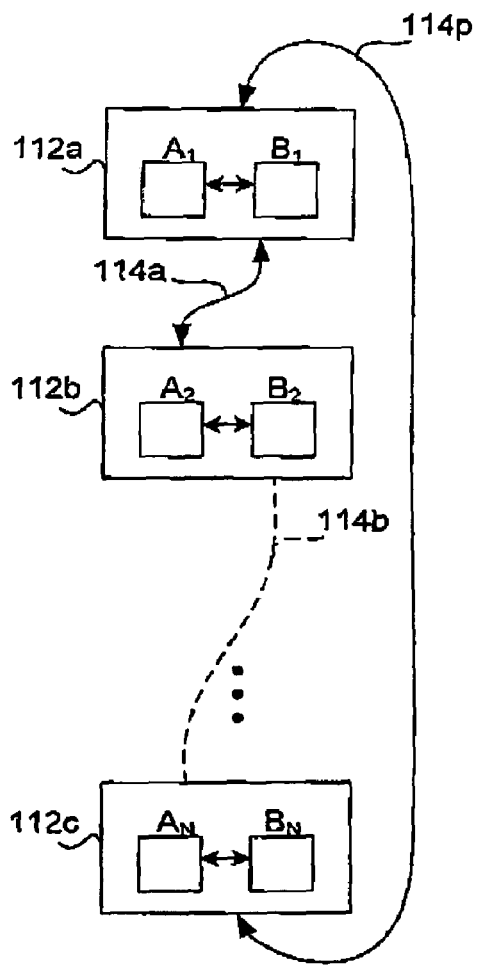
FIG. 1D  FIG. 1E

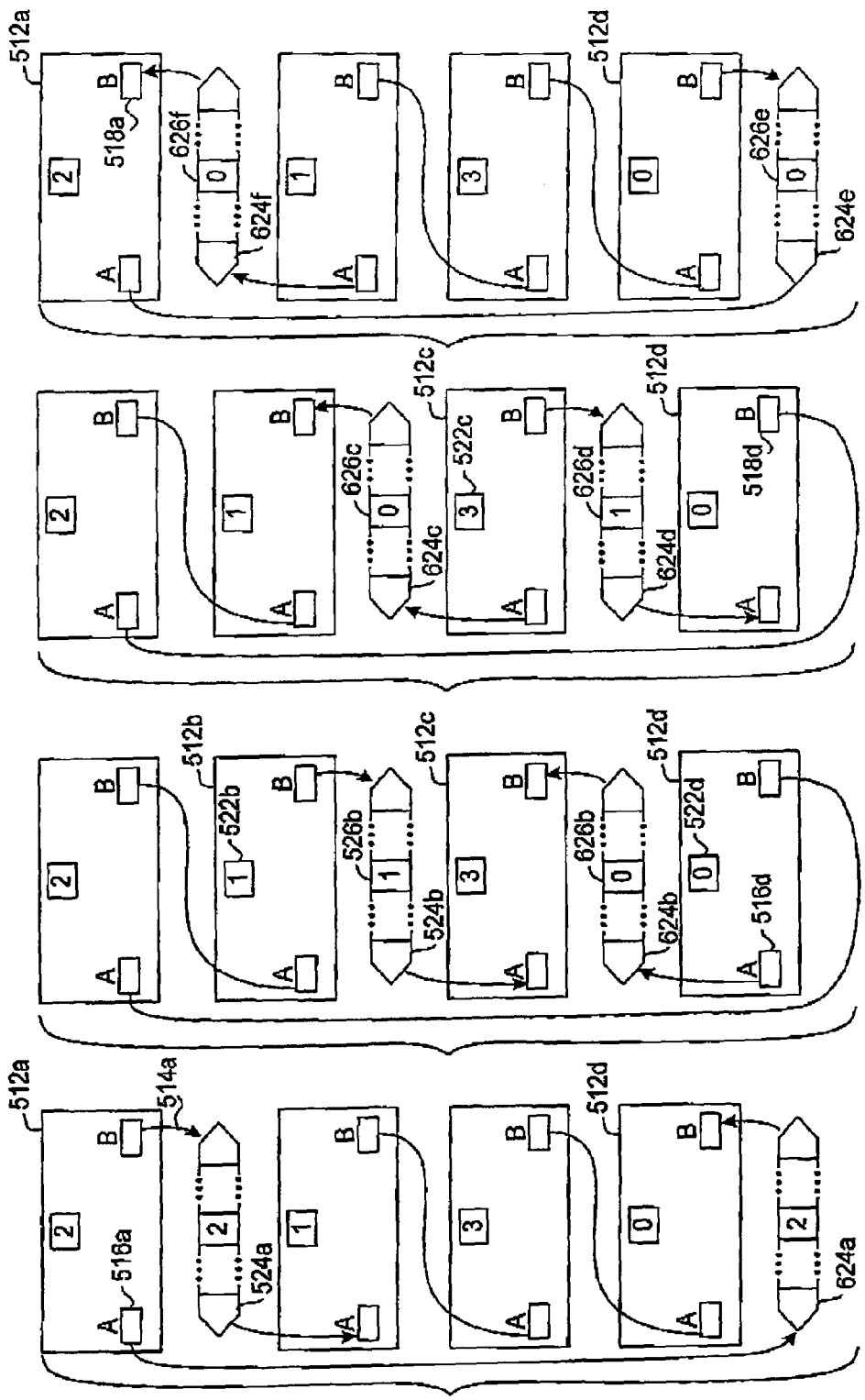

METHOD AND APPARATUS TO DETECT AND BREAK LOOP CONFIGURATION

Cross reference is made to U.S. patent application Ser. No. 09/321,066, filed May 27, 1999, entitled Distributed Network Repeater System; Ser. No. 09/330,434 filed Jun. 11, 1999, entitled Closely-Positioned Multiple GBIC Connector and Ser. No. 09/330,733, filed Jun. 11, 1999, entitled Distributed Network Repeater Module and Method all incorporated herein by reference.

The present invention relates to a method and apparatus which can automatically detect the presence of a loop configuration and can automatically break the loop, in a portion of a network or other electronic system, and in particular to a system which can reliably select a component as a loop breaking master.

BACKGROUND INFORMATION

A number of electronic and/or optical systems can be configured to provide a plurality of nodes with the nodes communicating among one another (and/or with other parts of the system) over a plurality of communication links. Although some or all features of the present invention can be applied to substantially any electrical, optical or electro-optical system having a plurality of nodes communicating over links, one useful illustrative example involves a plurality of nodes, each of which is a repeater for use in the context of a network transceiver, such as an Ethernet transceiver or switch. Although some or all features of the present invention can be used with any of a plurality of communication links (such as optical fiber links, infrared (IR) radio or other wireless links and the like), in one illustrative example, the links can include cables connecting ports of the repeaters to one another.

In any group of connected nodes, two classes of connection topologies are possible: open and closed topologies. In open topologies (a message sent from a first node cannot return to the first node without passing through at least one of the communication links more than once. FIG. 1A illustrates one example of an open-class topology, in this case a linear arrangement. FIG. 1B illustrates a closed-class or "loop" topology, in which it is possible for a message sent from a first node to return to the same node without traversing any communication link more than once. For example, in the open system of FIG. 1A, if a message is sent from the top node to the bottom node (following the port path: $A_1$, $B_1$, $A_2$, $B_2$, $A_N$, it is impossible for the message to be returned to the top node without passing a second time through at least one of the communication links 114a, 114b, 114n. In contrast, in FIG. 1B, the communication links 114a, 114b, 114n, 114p form a closed or loop configuration. A message sent from the top node to the bottom node via communication links 114a, 114b, 114n can return to the top node via communication link 114p, i.e. without traversing, a second time, any of the communication links.

Although there may be many multi-node electrical or optical systems in which either (or both) of a closed-class topology or an open-class topology may be used, there are also some systems in which it is desired to avoid or eliminate loop configurations. One example is when the nodes are repeaters of an Ethernet transceiver. In this example, the presence of a loop configuration among nodes can result in collisions of packets or other communications (i.e. the presence of two or more packets on the same link or node during substantially the same time period). Accordingly, it would be useful to provide a system which can detect the presence of a loop configuration. It would further be useful to provide a system which can, preferably substantially automatically (i.e. without the need for human control, or manipulation), break the loop or otherwise reconfigure the system to eliminate the loop configuration (preferably converting it to an open-topology configuration).

Many electrical or optical systems operate according to one or more communication protocols, e.g. defining items such as the size and fields of communication packets (if any), the steps to be taken in response to certain types or contents of packets and the like. Because it can be disruptive and expensive to redesign and implement a new communication protocol, especially for systems that already have a relatively large installed base of apparatus, it would be useful to provide a system, a method and apparatus for detecting and/or breaking loop configurations which is substantially compatible with at least some existing communication protocols in the sense of avoiding substantially interfering with communication protocols used by a current installed base of apparatus. Preferably, a system, method and apparatus to detect and/or break configurations can operate quickly (preferably requiring less than about 15 seconds, more preferably less than about 10 seconds and even more preferably less than about 5 seconds) to perform detection and/or loop breaking operations e.g. in a system of 8 nodes or less. Preferably, such a system is reliable, such as being substantially immune to at least certain types of communication errors or losses and/or without producing undefined states, and is preferably relatively easy and/or inexpensive to implement, such as requiring only (or, in some embodiments, mostly) software changes in order to implement an existing apparatus.

In some electrical or optical multi-node systems, the effective loss of a node and/or a communication link (e.g. from hardware or software failure, environmental challenge, operator error or the like) can disrupt the system such as by isolating one or more nodes in a group from communicating with other nodes in the group. For example, in the configuration depicted in FIG. 1A, if the last communication link 114n becomes inoperative, the last node 112c cannot communicate with the remaining nodes 112a 112b. Accordingly, it would be useful to provide an electrical or optical system in which the effective loss of a communication link or node, or other isolation of a node (or group of nodes) can be detected. It would further be advantageous to provide a system in which, in response to at least some types of isolation of one or more nodes, a communication link or path to the isolated node or nodes can be reestablished, preferably substantially automatically.

SUMMARY OF THE INVENTION

The present invention includes a recognition of the existence, source and/or nature of certain problems, including as described herein. In one aspect, the presence of a loop is detected by a procedure which involves a node sending a communication to one or both of its neighbors, each neighbor, in turn, passing the communication on to the next neighbor. The communication includes a value or characteristic with the property that only one of the nodes has (or is associated with) the particular value or characteristic. Each node compares its own value or characteristic with that contained in the received message and substitutes its own value or characteristic into the message (before transmitting it to its neighbor) only if its own value or characteristic is closer to the particular value or characteristic than the value or characteristic which was contained in the received communication. As one illustrative example, the value or characteristic can be the node address and the particular value or characteristic can be the lowest (or highest) node address in the system. In this example, a node begins the process by transmitting a loop-detecting message to, e.g., one of its neighbors with the initiating node placing its own address in the message. The next node, upon receiving the message compares the received address to its own address and substitutes its own address if its own address happens to be smaller than the received address (i.e. happens to be closer to the lowest node address in the system). After such substitution (if any) the message is then passed on to the next node (if there is a next node) which performs a similar process, substituting its own address only if it is lower than the received address. Each node also, in doing the comparison, can detect if the received address is equal to its own address. In the described example, a node can only receive a message having an address equal to its own address if (a) the node has the lowest address of any node in the actively communicating system and (b) the node had previously sent out its own address in a loop-detecting communication (since this is the only way for this address to be placed into a circulating loop-detecting message). However, at this point, it is known that a node has sent out a message and the message has passed through the communication system, without passing through any link or node more than once, and yet has returned to the originating node. In other words, at this point it is known that the nodes and communication links form a closed or loop configuration.

Although the system can be initiated in any of a number fashions, including on a periodic basis, in response to a request from an external controller or other source, preferably a loop detection process is initiated in response to detecting that a new node and/or communication link has been added or deleted from the system.

In one aspect, the system provides the ability to, preferably substantially automatically, reconfigure a closed system to place it into an open-type topology. In one embodiment, the invention is implemented in a system in which a loop configuration is substantially circular (each node has exactly two communication links and each communication link is coupled to exactly two nodes). In at least this type of system, the loop can be broken by effectively disabling any single link, and the system will still be operable as an open system, with each node still being able to, at least indirectly, communicate with each other node. In order for a successful reconfiguration to occur (effectively disabling a single link, but no more than one link) the present invention preferably provides a system, method and apparatus which provides for a single one of the nodes to act as a loop breaking master. Although it would be possible to pre-designate one of the nodes as the master (such as providing it with a unique hardware or other signature or capability) such an approach may not be as desirable as other approaches. Predesignating a node (or communication link) as a master (or otherwise unique) places a burden on the user to assure that every system is installed in such a manner as to have exactly one (and no more than one) unique node (or communication link). This burden may be infeasible, especially in systems in which nodes or communication links are substantially modular (can be readily added or removed by users). Additionally, such a system would typically fail to detect and/or break loops if the unique node or communication link became disabled or was removed.

According to one embodiment of the invention, the same system which is used for detecting a loop is also used for designating the loop-breaking master node. In one embodiment, whenever a node detects a loop (by receiving a loop detection message which contains the node's own address) that node designates itself as a loop-breaking master node. Of course, it is possible to provide numerous variations such as always designating the next-higher-address neighbor as the master, and the like. It is also possible for the master node to delegate some or all operations involved in breaking the loop to a different node.

For example, if the first node 112a in the illustration of FIG. 1B is the master loop breaker, the first node 112a can break the loop by deactivating a communication link, such as the link connected to its second or "B" port, 114a, as illustrated in FIG. 1C (with a deactivated communication link being illustrated in phantom). Preferably, deactivation of a link is provided in a reversible manner, i.e., so that the deactivated link can later be re-activated, including as described below. For example, link 114a can be deactivated by operating a switch (preferably an electronic switch) which prevents signals passing through the "B" port. It would also be possible to effectively deactivate communication link 114a using a substantially software procedure, such as causing the first node 112a to suspend the sending of any messages out through the "B" port and ignoring any messages received at the B port.

In one aspect, embodiments of the present invention can provide for reactivating a currently-deactivated communication link, e.g., in response to detecting a condition in which one or more nodes are isolated (cannot communicate with at least some other nodes). As one illustrative example, if the system as illustrated in FIG. 1C suffered a change which caused communication link 114b to become substantially inoperable, as depicted in FIG. 1D (e.g. from a hardware failure, software failure or operator action), then the second node 112b is isolated. The second node 112b cannot communicate via the A port because communication link 114a was previously (intentionally) deactivated, and cannot communicate via the "B port because communication link 114b has become substantially inoperable, as described in this example. In at least some embodiments of the present invention, in response to detecting this condition (e.g. via a "link lost" condition detected at the third node 112c and communicated to the first node 112a via communication link 114p) one of the nodes, preferably the same node which originally (intentionally) deactivated link 114a, will reactive link 114a, providing the configuration depicted in FIG. 1E. As can be seen in FIG. 1E, the system no longer contains isolated nodes (node 112b can communicate with node 112a via link 114a) and the system does not contain a loop (since communication link 114b is substantially inoperable).

As illustrated in FIGS. 1C-1E, it can be advantageous to provide a system which includes one or more controllable (activatable and/or deactivatable) redundant communication links (even though this may require judicious control or configuration to avoid loops) since controllable redundant communication links can be activated or otherwise used to maintain desired communication capabilities even after there has been a failure (such as a loss of a communication link). Accordingly, in one embodiment of the invention, systems are intentionally configured (and/or users are instructed to configure their systems) such that one or more redundant links are provided, with the system (preferably substantially automatically) reconfiguring the system to deactivate links, as needed to avoid loops, while preferably retaining the capability to (preferably substantially automatically) reactivate links in order to maintain desired communication (e.g. in response to a change which isolates one or more nodes).

In one aspect, in a system having a plurality of nodes (such as Ethernet repeaters), coupled by communication links (such as cables), systems and protocols are provided for detecting and/or breaking loops. In one aspect, in response to an added link, a repeater sends a "detect loop" message, containing its own address, to at least one neighbor. Each repeater which receives the "detect loop" message, in turn, sends it to its own neighbor, with the lesser of the received address and its own address. A repeater which receives a "detect loop" message containing its own address declares itself a master loopbreaker and can isolate one of its ports to break the loop. In one aspect, a previously intentionally-isolated port can be re-activated, e.g., in response to the loss of a communication link which could potentially isolate one or more nodes.

BRIEF DESCRIPTION OF THE DRAWINGS

FIGS. 1A through 1E are block diagrams of a system of nodes and communication links in various states, including states that can be achieved according to embodiments of the present invention;

FIGS. 6A through 6D are block diagrams of a plurality of repeater modules and selected communications therebetween during various stages of a loop detect process according to an embodiment of the present invention;

DETAILED DESCRIPTION OF THE PREFERRED EMBODIMENT

Figure 2:
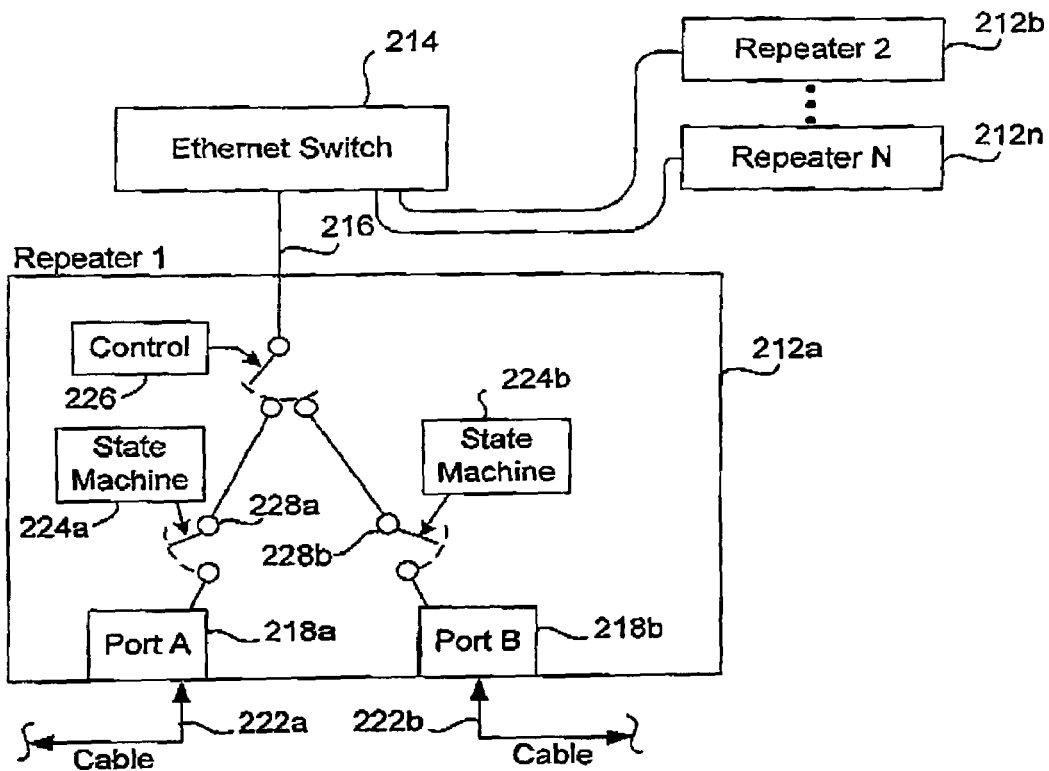
FIG. 2 is a block diagram of an Ethernet switch and coupled repeaters of a type which can be used in connection with implementing embodiments of the present invention.

Although some or all features of the present invention can be implemented in a wide variety of electrical, optical or electro-optical systems, in one illustrative example, as illustrated in FIG. 2, the nodes of a system can be a plurality of Ethernet repeaters 212a, 212b, 212n coupled to a Ethernet switch 214 in an Ethernet network. Examples of repeaters that can be used in connection with the present invention include those as described in U.S. patent application Ser. Nos. 09/321,066; 09/330,434; and 09/330,733, supra, in which the repeaters are gigabit Ethernet repeaters. In the depicted embodiment, the repeaters 212a,b,n can act as three-port repeaters to provide a shared channel of communication 216 "Port C" between the host 214 and other repeaters coupled to first and second ports 218a,b over cables 222a,b or other external links, or as a short-haul full duplex link between two systems equipped with repeaters. In PCS-bypass mode, a repeater receives data from the host, one of the ports, or one of the external links 222a, 222b and retransmits data to the other link (with timing and signal levels restored). In half-duplex mode, the repeater receives and decodes data from any of its three links. After restoring the signal timing, amplitude and coding, the repeater retransmits the data to the other two links, if no other carrier event is detected. The illustration of FIG. 2 is simplified, at least in that circuitry for providing timing, amplification, and buffering or storage of data is not expressly depicted, although those of skill in the art will understand how to provide and use repeaters in the context of an Ethernet system to implement embodiments of the present invention, at least after understanding the present disclosure.

In the illustration of FIG. 2, connection among the various ports and/or generation of signals to be sent, or handling or storage of signals received, is at least partially controlled by one or more state machines 224a, 224b or other control circuitry 226. A state machine according to one embodiment of the present invention will be described more thoroughly below. In the embodiment of FIG. 2, under control of the state machines 224a,b, the ports 218a,b may be isolated, e.g., by operation of (opening of) switches 228a,b (although shown as mechanical switches, switches 228a,b would typically be provided as transistor or electronic switches).

Preferably, each repeater 212a,b,n has a capability (e.g. implemented in a state machine 224a,b) of detecting whether there is an operative communication link from either or both of the ports 218a, 218b and another node. In one embodiment, a link is detected if a specified synchronization signal is detected and a full-half duplex auto negotiation process completes. An example of full-half duplex auto negotiation is described, e.g., in Ser. No. 09/330,733, supra.

Figure 3:
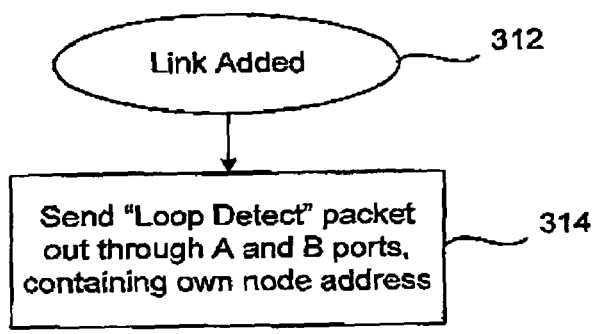
FIG. 3 is a flow chart of a process for initiating a loop detect procedure.

According to one embodiment of the invention, a loop detect process is initiated and a repeater detects that a link has been added 312 (FIG. 3). In this embodiment, in response to detection of a link added, the repeater will send a "loop detect" packet out through both of its ports, if both ports have links attached then. In one embodiment, the loop detect packet (which may, in some embodiments, include a plurality of sub-packets) includes a field for at least partially specifying the address of the node 314. In one embodiment, each repeater uses the media access controller (MAC) address of the gigabit port on the Ethernet switch it is connected to, as its own address.

Although any number of protocols could be devised and used for sending "loop detect" messages, in one embodiment, the "loop detect" messages (and, preferably, other messages used in the system as described herein) is similar in form and protocol to messages already used in a full/half duplex auto-negotiation system. Preferably, the auto-negotiation system is point-to-point, such that a "loop detect" message, sent to a neighbor, will not be received by other nodes in the system unless the neighbor re-generates it. An advantage of using a form or protocol for messages similar to that already used (e.g., in an installed base of apparatus) is to facilitate implementing invention in a fashion which can be backwards compatible (so that implementation of the present invention does not disrupt or otherwise substantially affect operation of current apparatus) and/or such that little or no modification or replacement of existing apparatuses is required in order to implement the present invention. In one embodiment, the present invention can be implemented by using existing Ethernet switches (or other components) in connection with repeaters which have been configured with state machines 224ab which implement embodiments of the present invention, e.g., as described more thoroughly below. In one embodiment, a "loop detect" message is substantially similar in length to an auto negotiate message; but, in a field which, in the auto negotiate message, always has a first content (e.g. all zeros), the "loop detect" message will have a different content (at least one non-zero bit) to identify it as other than an auto negotiate message and, in particular, as a "loop detect" message. As will be understood by those of skill in the art, the repeaters can include circuitry which parses this field of messages and handles the message as an auto negotiate message if this field contains all zeros and, otherwise, handles this message (e.g. as described below) as a "loop detect" message in response to other contents in this field. Typically, the "loop detect" message will contain additional information such as a "least MAC address." In general, in a point-to-point system a source address field and/or a destination address field is not needed or provided. If desired, data integrity can be provided by an acknowledgment field which echos the data field(s) previously received.

Figure 4:
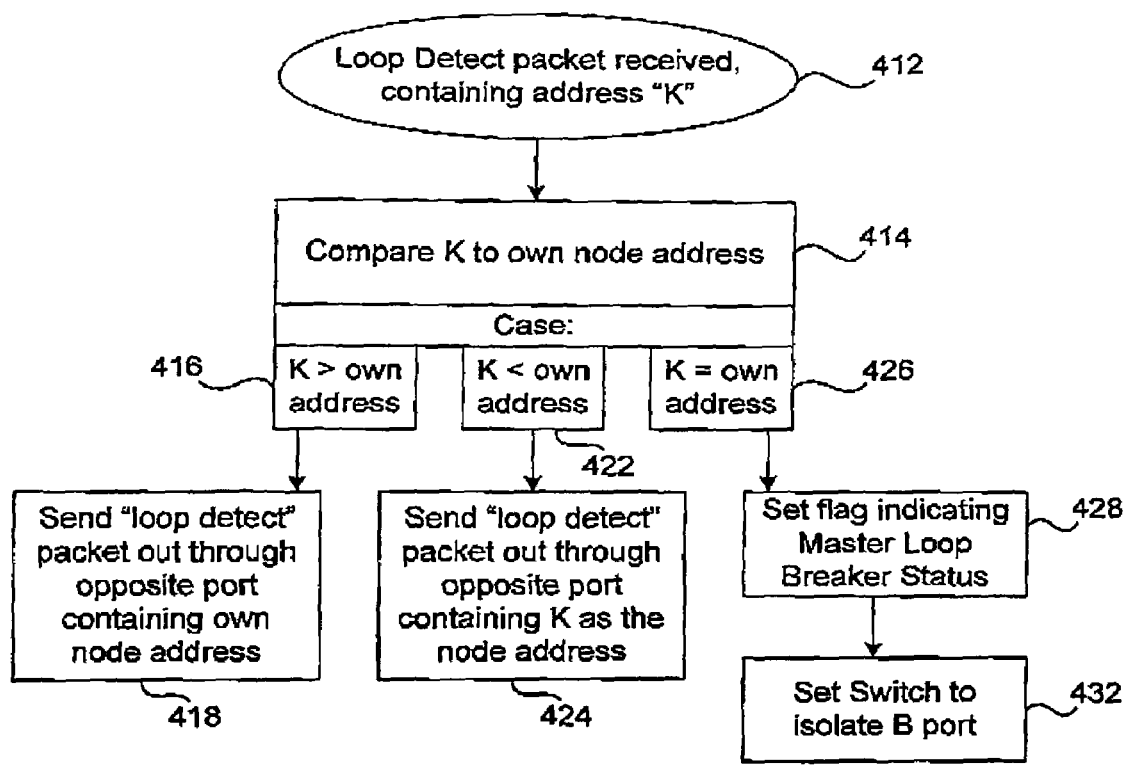
FIG. 4 is a flow chart of a process providing loop detect and breaking according to an embodiment of the present invention.

As depicted in FIG. 4, when any repeater receives a loop detect packet, which will contain some address (designated "K") as the least MAC address, 412, the repeater will compare the value of K to its own node address 414. If the repeater determines that K is greater than its own address, the packet will generate a "loop detect" message, which will contain its own address as the "least MAC address", thus creating a new value for "K" and will then send the packet out through its opposite port, i.e. the port other than that where the packet was received (at least, if the opposite port is coupled to another node). It is noted that, at least in this embodiment, although two "least MAC addresses" can be sent out (from the two ports) substantially simultaneously, each is sent out from the port which is opposite the port where it was received. That is, a received message is not sent directly back to the repeater where it was just received from. If the repeater determines that K is less than the repeater's own address, the repeater will send the "loop detect" packet out through its opposite port unaltered, i.e., containing K, as received, as the "least MAC address" 424. If the repeater determines that the value of the received "least MAC address" (i.e. K) is equal to its own address 426 that repeater will set a flag indicating "master loop breaker" (MLB) status 428. If two (neighboring) repeaters both determine, at substantially the same time, that there is a loop, preferably, a tie-breaker protocol is provided, such as allowing the repeater which has the larger address to declare itself the maser loop breaker. Preferably, each repeater has information indicating the MAC address of its neighbor(s).

At this point, the presence of a loop has been detected and it would be possible to implement embodiments of the invention in which the process stops at this point and/or outputs an indication of the existence of a loop, e.g. for appropriate manual handling by an operator and the like. Preferably, however, in response to the detection of a loop, the MLB will disable one of the ports, in this example, it's own second or B port 432. Preferably the port is disabled in a fashion such that it can later be reenabled. In some embodiments, disabling the port involves suspending receipt or transmission of normal communication packets through the port (although, in some embodiments, the port may still be used for receiving or transmitting negotiation or similar system or control packets). In this way a communication link 432 can be effectively suspended or eliminated, even without physically removing or switching off the link medium.

Figure 5C:
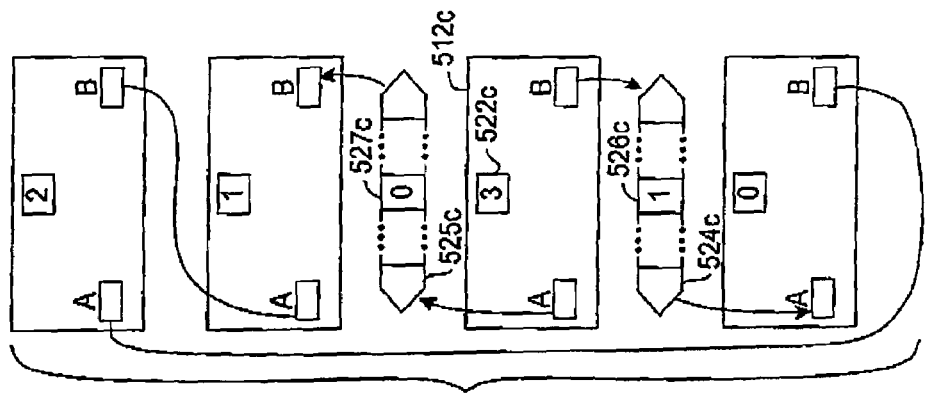
FIGS. 5A through 5E are block diagrams of a plurality of repeater modules and selected communications therebetween at various stages during a loop detect process according to an embodiment of the present invention.
Figure 5B:
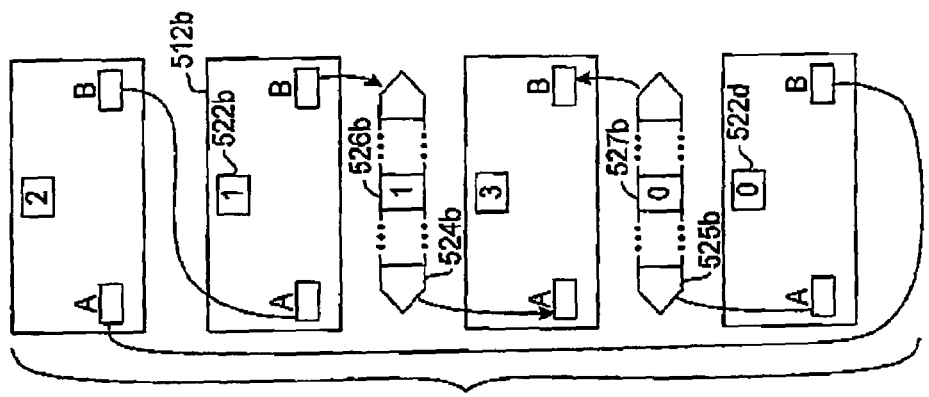
Figure 5A:
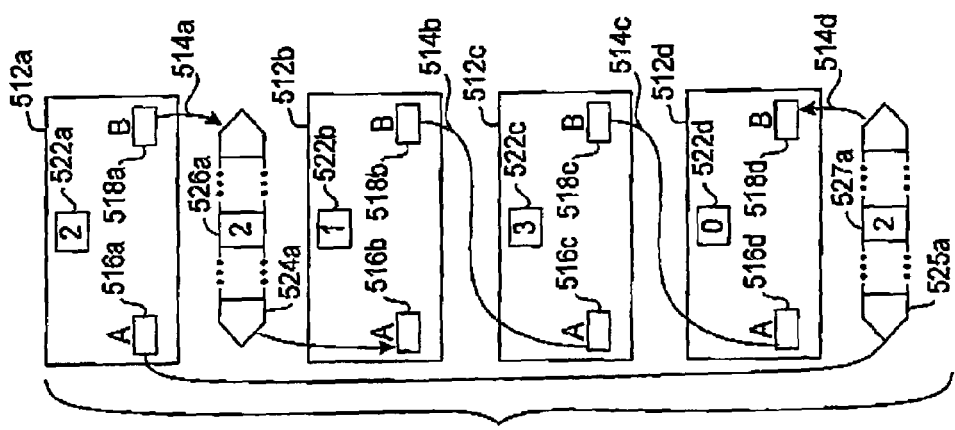

FIGS. 5A through 5G depict one example of a series of communications among repeaters resulting in detection of a loop, according to an embodiment of the present invention. In the example of FIGS. 5A through 5G, four repeaters 512a,b,c,d (coupled to a Ethernet switch, not shown) each contain first or "A" ports 516a,b,c,d and second or "B" ports 518a,b,c,d. In each instance, a B port 518 of a repeater is coupled to an A port of a neighbor repeater by a communication link 514a,b,c,d. Each repeater has a node address and includes a memory or other device 522a,b,c,d for storing (or receiving) its own address. In the example of FIG. 5A, the first repeater 512a has an address of two 522a, the second repeater 512b has an address of one 522b, the third repeater 512c has an address of three 522c and the fourth repeater 512a has an address of zero 522d. As an illustrative example, if the configuration of the system is changed, e.g., to add the last communication link 514d, achieving the configuration depicted in FIG. 5A, when a repeater, e.g., 512a, detects the occurrence of a new link 514d, it outputs from it's A and B ports 516a, 518a, "loop detect" packets 524a, 525a each of which includes a field storing a value K 526a, 527a equal to the repeater's 512a own address 522a, in this case K=2. When the second repeater 512b receives this packet 524, using a procedure similar to that depicted in FIG. 4, it will compare the value of K 526a to its own address 522b. In this case, K is greater than its own address 416 and accordingly, the second repeater 512b, as depicted in FIG. 5B, will output a loop detect packet 524b which will be similar to the received packet except that the "least MAC address" field will have a value equal to the address 522b of the second repeater 512b. Similarly, repeater 512d will output from it's a port a packet 525b having a least MAC address with 527b with a value of K=0 (since repeater 512d's own address 522d is zero and is thus less than the received least MAC address 527a). As depicted in FIG. 5C, when the third repeater 512c compares its own address 522c to the "least MAC address" of the received packet 524b, since its own address is greater than the value of K in the received packet 422, the third repeater will output a packet 524c which will be substantially identical to the received packet, i.e., which will have the same value in the "least MAC address" field 526c as was contained in the corresponding field of the received packet 526b. At substantially the same time, the third repeater 512c compares its own address 522c to the "least MAC address" of the received packet 525b. Since its own address is greater than the value of K in the received packet, the third repeater will also output, from it's A port, a packet 525c which will be substantially identical to the received packet, i.e., which will have the same value in the "least MAC address" field 527c as was contained in the corresponding field of the received packet 527b.

The fourth repeater 512d, having an address 522d less than the "least MAC address" of the received packet 526c, will output a packet 524d (FIG. 5D) which has its own address 522d (in this case a value of zero) in the "least MAC address" field 526c (i.e., K=0). At generally the same time, the second repeater 512b, having an address 522b greater than the "least MAC address" of the received packet 527c, will output a packet 525d which has the same value in the "least MAC address" field 527d as was contained in the corresponding field of the received packet 527c.

Figure 5E:
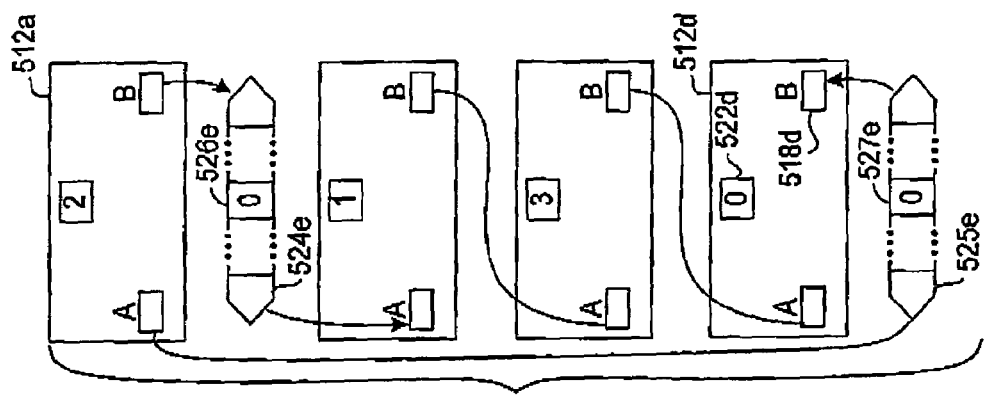
Figure 5D:
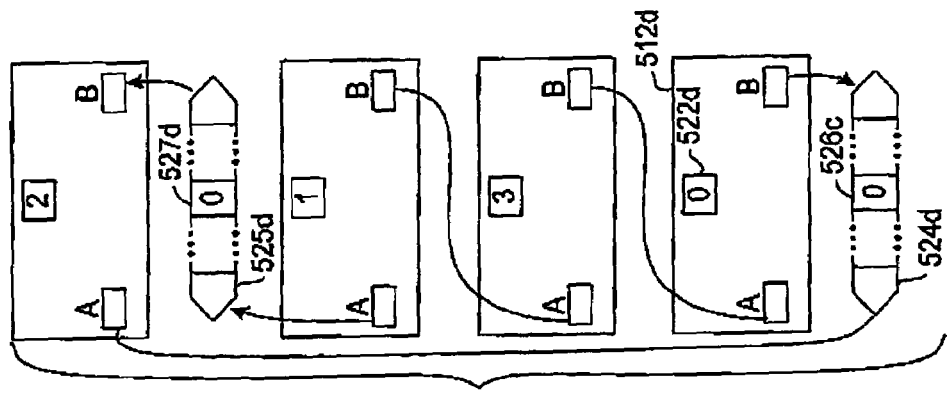

As depicted in FIG. 5E the first repeaters 512a, having an address greater than the received "least MAC address" 527d will output a loop detect packet 525e from it's A port, to the fourth detector 512d which has the same value in the "least MAC address" field 527e as was contained in the corresponding field of the received packet 527d. In the configuration of FIG. 5E, the last or fourth repeater 512d will thus receive a packet 525d containing a "least MAC address" 527e which is equal to its own address 522d. Accordingly, using the procedure of FIG. 4, the fourth repeater 512d will set a flag declaring itself to be the master loop breaker, and will set a switch to isolate its B port 518d, thus effectively breaking the loop.

FIGS. 6A through 6C depict another procedure for detecting a loop. The procedure of FIGS. 6A through 6C is similar to that of FIGS. 3 through 5 except that a repeater will declare the existence of a loop if it receives two packets (at it's A and B ports) which have the same "least MAC address". Thus, in the embodiment of FIG. 6A, when the first repeater 512a detects a link added 412, it outputs a first loop detect packet 524a (as described above) through the first link 514a, (which will be received by the second repeater 512b) and outputs an identical loop detect message 624a through it's A port 516a, (which will be received by the fourth repeater 512*d*). As depicted in FIG. 6B, in response, the second repeater 512*b* outputs a loop detect packet 524*b* (having a "least MAC address equal to 1) and, substantially simultaneously the fourth repeater 512*d* outputs, through it's a port 516*d* a loop detect packet 624*b* having its least MAC address 626*b* equal to zero (since the address 522*d* of the fourth repeater 512*d* is less than the least MAC address of the received packet 624*a*). Thus, as seen in FIG. 6B, the third repeater 512*c* will receive two loop detect packets 524*b*, 624*b*. As seen in FIG. 6C, the fourth repeater 512*d* will receive a packet 624*d* which has, as its least MAC address 626*d* a value equal to one, and the second repeater 512*b* will receive a packet 624*c* which has, as its least MAC address 626*c*, a value equal to zero. As seen in FIG. 6D, the first repeater 512A will receive two packets, respectively, through it's a and B ports. The two received packets 624*e*, 624*f* have identical values for the "least MAC address," 626*e,f*, namely a value of zero. In response, the first repeater 512*a* will set a flag indicating its master loop breaker status 428 and will set a switch to isolate its B port 518*a*.

As can be seen from comparing FIGS. 5A through 5E with FIGS. 6A through 6D, a potential advantage of the procedure of FIGS. 6A through 6D is that it may complete a loop detect process in fewer steps or cycles, compared to the process of FIGS. 5A-E.

Figure 7:
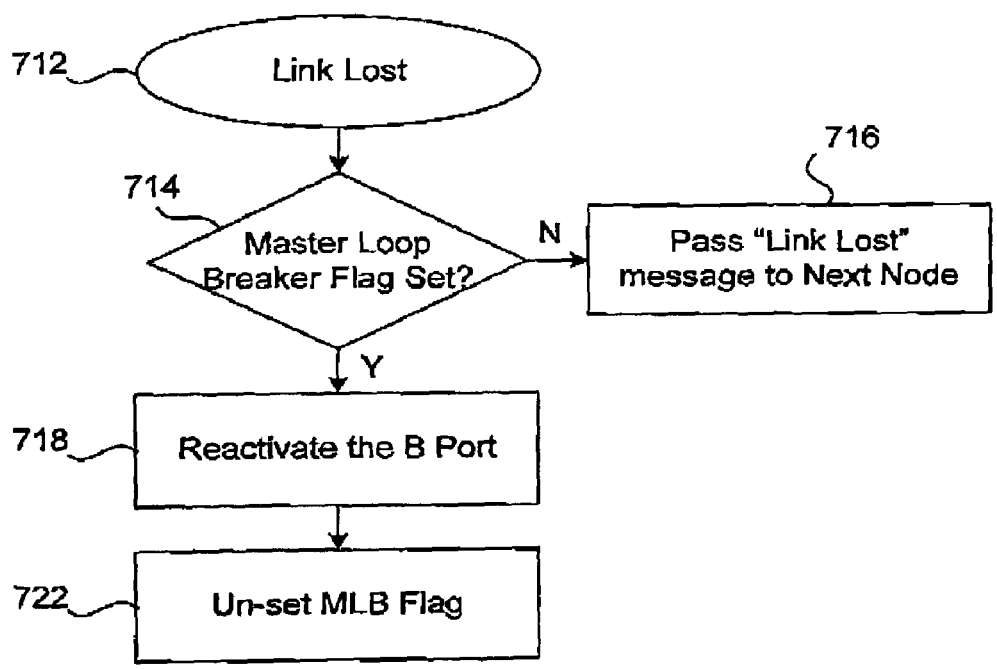
FIG. 7 is a flow chart of a process for correcting an isolated node configuration.

As depicted in FIG. 1C, once a communication link 114*a* of a loop configuration has been effectively disabled, the remaining configuration provides an open or non-loop system in which all nodes can at least indirectly communicate with each other. However, if, subsequently, another communication link becomes disabled, as depicted in FIG. 1D, 114*b* one or more nodes 112*b* may become isolated, i.e., without any communication link which can be used for communicating with at least some of the remaining or other nodes. In the embodiment of FIG. 7, in response to the detection of a lost link 712 (such as the effective disabling of link 144*b*) a lost link message 712 will be sent. In the embodiment of FIG. 7, each repeater which receives a "lost link" message, if it is not the MLB 714, will pass the "lost link" message to the next node 716. When the "lost link" message is received by the MLB node, it will reactivate its B port 718 (i.e. port B₁) in the embodiment of FIG. 6E), causing the effective reactivation of the associated communication link 114*a*, thus restoring the system to a configuration in which all nodes can communicate with one another, i.e., in which there are no isolated nodes.

The MLB will then unset its MLB flag 722. The reactivation of a previously (intentionally) deactivated communication link can also be achieved using procedures other than that depicted in FIG. 7. For example, in one procedure, each node which receives a "lost link" message will assure that both its ports are active and will make sure that its MLB flag is unset and will then pass on the "lost link" message to neighboring nodes. Thus, in this procedure there is no need for each node to specifically determine whether it is the MLB and to take different actions depending on the result.

In general, it can be advantageous to provide a system having a configuration similar to that depicted in FIG. 1C (in which there is a "redundant" deactivated link 114*a* which, if activated, would create a loop configuration), since this affords the opportunity to reconfigure a system which has lost a link (as depicted in FIG. 1D) so as to restore desired communication abilities (as depicted in FIG. 1E). Preferably, and using procedures similar to those described above, any or all of the detecting of a loop, the breaking of a loop or the reactivation of a link in response to a lost link can be achieved substantially automatically, i.e. without the need for a user to note or respond to light or other signals or outputs, and without the need to manipulate or reconfigure cabling or otherwise perform some manipulation. However, even though the present invention can be implemented fully or partially automatically, i.e. without the need for human intervention or manipulation, nevertheless, if desired, certain human involvement may be provided for, such as by providing for LED or other light output, computer console output and similar output indicating the presence of a loop detection, a loop breaking and/or a communication link reactivation. Such output may be useful in system maintenance, troubleshooting and the like.

Figure 8:
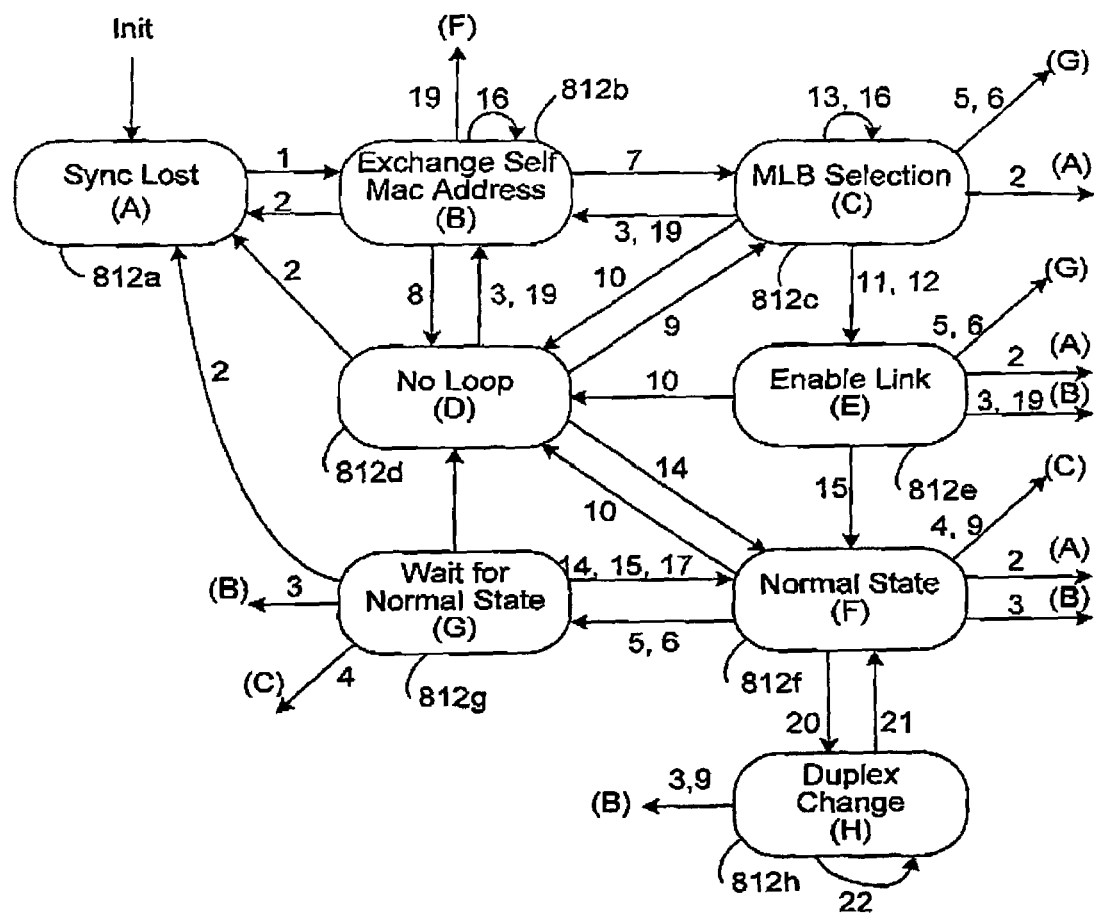
FIG. 8 is a state diagram of a process, according to an embodiment of the present invention, as understood in conjunction with Tables I, II and III.

FIG. 8 depicts a state diagram that can be used, e.g., in implementing a state machine according to an embodiment of the present invention. Those of skill in the art will understand how to provide a state machine to implement a state diagram, e.g., as depicted in FIG. 8, at least after understanding the present disclosure. As depicted in FIG. 8, a state machine can be in any of a plurality of different states 812*a-h*. Table I provides a brief description of states 812*a* through 812*h*. Transitions from one state to another are triggered by various events indicated in FIG. 8 by numerals 1 through 22. Table II describes events 1 through 22. Table III is a state transition action table for the state diagram of FIG. 8.

TABLE I

The states shown in FIG. 8.

A. Sync Lost State: The sync on the link is lost. It will transition into state B when the sync comes back.
B. Exchange Self Mac Address State: Send the node's own MAC address to the link's neighbor, and wait for acknowledgment. It will transition to state C or D after the acknowledgment for the last byte of the MAC address is received.
C. MLB Selection: Send the local least MAC to its link neighbor, and compare the received MAC with the local least MAC to see if it is equal to its own MAC to decide if it should appoint itself as the Master Loop Breaker.
D. No Loop State: One other link in the node stack has lost sync. It could be the other link on the same node, or the other link on the same node received Sync_Lost_Detected code word from its neighbor. It will move to state F state after Sync_Lost_Detected is sent to the neighbor (an acknowledgment is received) or to state C when the syncOK is detected from the other link

TABLE II

Events that trigger the state transitions for FIG. 8.

1. SyncOK detected.
2. SyncOK Lost Detected.
3. Lpbr_Start code word received.
4. Sync_OK_Detected code word received from the link neighbor.
5. Sync_Lost_Detected code word received from the link neighbor.
6. Link_Enable code word received from the link neighbor.
7. MAC ID byte received from the link neighbor and both external links are sync OK.
8. MAC ID byte received from the link neighbor and only one link has sync OK.
9. Sync_OK_Detected code word received on the other link (or Sync OK detected on the other link.
10. Sync_Lost_Detected code word received on the other link (or Sync lost on the other link).
11. Linc_Enable code word received on the other link.
12. MAC ID received on the other link and it is equal to the self MAC sent from the link (MLB chosen to be the node itself).
13. Ack of Sync_OK_Detected code word received.
14. Ack of Sync_Lost_Detected cord word received.
15. Ack of Link_Enable code word received.
16. Ack of MAC ID byte received.
17. Link neighbor becomes normal (code word = 0).
18. Node is in the process of changing duplex mode.

TABLE II-continued

Events that trigger the state transitions for FIG. 8.

19. Timeout: No acknowledgment received after 15 seconds.
20. Autonegotiation results in full-duplex mode.
21. Duplex change in progress.
22. Duplex change in progress.

The following is a table showing actions taken upon each state transition: (X means any state from A to G except the end state)

TABLE III

| State Transition | Event | Actions |
| --- | --- | --- |
| A -> B | 1 | Send Lpbr__Start code word to the link neighbor, activate the timer event that will wake up high priority process periodically. |
| B -> D | 8 | Send the Sync__Lost__Detected to the link neighbor. |
| B -> B | 16 | Send the next byte of the port's own MAC Address ID. |
| B -> C | 7 | Send the first byte of the local least MAC to the link neighbor. |
| B -> F | 19 | Turn on Tx/Rx on the link, deactivate the timer event. |
| C -> D | 10 | Send the Sync__Lost__Detected to the link neighbor. |
| C -> C | 13, 16 | Send the next byte of the least MAC address ID to the link neighbor. Compare the received least MAC with the port's own MAC. |
| C -> E | 12 | Send Link. Enable code word to the neighbor. Turn off Tx/Rx on the redundant link. |
| C -> E | 11 | Send Link__Enable code word to the link neighbor. |
| D -> C | 9 | Send Sync__OK__Detected to the neighbor link. |
| B, D -> F | 14 | Enable Tx/Rx on the link, deactivate the timer event. |
| E -> D | 4 | Send the Sync__Lost__Detected to the link neighbor. |
| F -> G | 5, 6 | Disable C link, activate timer. |
| F -> C | 4 | Send Sync__OK to the link neighbor. |
| G -> A | 14 | Toggle the link to reset state on the link neighbor and itself. |
| G -> F | 14, 15, 17 | Turn on Tx/Rx on the link, deactivate the timer event. |
| H -> H | 22 | Take necessary steps to change duplex mode. |
| B, C, E, F, G -> D | 10 | Send the Sync__Lost__Detected to the link neighbor. Turn Tx/Rx of the redundant link on if the node is the MLB and Tx/Rx on the redundant link is off. |
| C, D, E -> B | 19 | Restart the loop breaking process, activate the timer if not already active. |
| F, H -> B | 3 | Restart the loop breaking process, activate the timer if not already active. |
| B, C, D, E, F, G -> A | 2 | Reset state machine, deactivate the timer event. |

Although FIG. 8 and Tables I through III provide an example of a system which can operate according to an embodiment of the present invention, the present invention can also be implemented in other fashions such as using other configurations of state machines, or configurations which do not use traditional state machines, such as implementing the invention by control provided by a programmed microprocessor or computer.

In light of the above disclosure, a number of advantages of the present invention can be seen. The present invention can provide a system for detecting the presence of a loop in an electrical, optical or electro-optical system having multiple nodes and communication links, preferably in a substantially automatic fashion. The present invention can provide for breaking a loop, preferably substantially automatically, so as to provide a open-type topology which still permits all nodes to at least indirectly communicate with all other nodes. The present invention can provide a system for reconfiguring the system to convert it from a system in which some nodes are isolated to a system in which all nodes can communicate with one another, at least indirectly. In at least some embodiments, the present invention can be implemented in a fashion which is substantially backwards compatible with existing protocols of the installed base of apparatus and/or which requires little or no modification or replacement of existing apparatus.

A number of variations and modifications of the invention can be used. It is possible to use some features of the invention without using others. For example, it is possible to use loop detecting without loop breaking. It is possible to use reconfiguration to correct isolated nodes without using loop breaking or detecting. Although the invention has been described in connection with a gigabit Ethernet network, some or all features of the present invention can be used in connection with other systems including other types of computer-based networks, local area networks, wide area networks, Internet installations or components, voice communication systems such as land line, microwave, cellular or satellite-based voice communications and the like. Although the present invention can be implemented in a substantially modular-repeater environment including as described in Ser. No. 09/330,733, supra, some or all features of the present invention can be used in connection with substantially integrated or otherwise non-modular repeaters or other components. Although the present invention was described including by examples in which nodes were repeaters of switch components, some or all features of the present invention can be implemented and systems where nodes are other types of devices including hubs, routers, switches, bridges, gateways, personal computers, printers or other peripheral devices, telephones or other communication devices and the like. Although embodiments were described in which packets are sent from both ports of a repeater, it is also possible (although not necessarily desirable) to implement operable embodiments in which packets are output only through one port, as part of a loop detect procedure.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for handling a communication in a network of nodes, each node having an associated identification that is unique from other identifications in the network of nodes, the method comprising:
   receiving, at a first node, a communication from a second node, wherein the communication includes an identification;
   determining, at the first node, whether the identification included in the communication is closer to, equidistant from, or further from a predetermined identification value than an identification associated with the first node;
   if the identification included in the communication is closer to the predetermined identification value than the identification associated with the first node, sending, from the first node to a third node, a communication including the identification that was included in the communication received from the second node;
   if the identification included in the communication is further from the predetermined identification value than the identification associated with the first node, sending, from the first node to a third node, a communication including the identification associated with the first node; and
   if the identification included in the communication is equidistant from the predetermined identification value as the identification associated with the first node, concluding that a loop exists in the network and appointing a node as a master loop breaker.

2. The method of claim 1, wherein the first, second, and third nodes are repeaters.

3. The method of claim 2, wherein the identification associated with the first node is a hardware address of a network device coupled to the first node.

4. The method of claim 3, wherein the network device is a switch.

5. The method of claim 3, wherein the network device is a gigabit Ethernet switch.

6. The method of claim 3, wherein the hardware address is a media access control (MAC) address.

7. The method of claim 1, further comprising, if the identification included in the communication is equidistant from the predetermined value as the identification associated with the first node, appointing the first node as a master loop breaker.

8. An apparatus for handling a communication in a network of nodes, each node having an associated identification that is unique from other identifications in the network of nodes, the apparatus comprising:
   one or more components to configured to:
   receive, at a first node, a communication from a second node, wherein the communication includes an identification;
   determine, at the first node, whether the identification included in the communication is closer to, equidistant from, or further from a predetermined identification value than an identification associated with the first node;
   if the identification included in the communication is closer to the predetermined identification value than the identification associated with the first node, send, from the first node to a third node, a communication including the identification that was included in the communication received from the second node;
   if the identification included in the communication is further from the predetermined identification value than the identification associated with the first node, send, from the first node to a third node, a communication including the identification associated with the first node; and
   if the identification included in the communication is equidistant from the predetermined identification value as the identification associated with the first node, conclude that a loop exists in the network and appoint a node as a master loop breaker.

9. The apparatus of claim 8, wherein the first, second, and third nodes are repeaters.

10. The apparatus of claim 9, wherein the identification associated with the first node is a hardware address of a network device coupled to the first node.

11. The apparatus of claim 10, wherein the network device is a switch.

12. The apparatus of claim 10, wherein the network device is a gigabit Ethernet switch.

13. The apparatus of claim 10, wherein the hardware address is a media access control (MAC) address.

14. The apparatus of claim 8, wherein the one or more components are further configured to, if the identification included in the communication is equidistant from the predetermined value as the identification associated with the first node, appointing the first node as a master loop breaker.

15. An apparatus for handling a communication in a network of nodes, each node having an associated identification that is unique from other identifications in the network of nodes, the method comprising:
   means for receiving, at a first node, a communication from a second node, wherein the communication includes an identification;
   means for determining, at the first node, whether the identification included in the communication is closer to, equidistant from, or further from a predetermined identification value than an identification associated with the first node;
   means for:
   if the identification included in the communication is closer to the predetermined identification value than the identification associated with the first node, sending, from the first node to a third node, a communication including the identification that was included in the communication received from the second node;
   if the identification included in the communication is further from the predetermined identification value than the identification associated with the first node, sending, from the first node to a third node, a communication including the identification associated with the first node; and
   if the identification included in the communication is equidistant from the predetermined identification value as the identification associated with the first node, concluding that a loop exists in the network and appointing a node as a master loop breaker.

* * * * *

UNITED STATES PATENT AND TRADEMARK OFFICE
CERTIFICATE OF CORRECTION

| | | |
|---|---|---|
| PATENT NO. | : 7,539,154 B1 | Page 1 of 1 |
| APPLICATION NO. | : 09/691419 | |
| DATED | : May 26, 2009 | |
| INVENTOR(S) | : MacKay et al. | |

It is certified that error appears in the above-identified patent and that said Letters Patent is hereby corrected as shown below:

COVER PAGE;

Item (75) Inventors, change "James P. Rivers" to --James R. Rivers--.

Signed and Sealed this

Thirtieth Day of June, 2009

JOHN DOLL
*Acting Director of the United States Patent and Trademark Office*